United States Patent [19]
Freese et al.

[11] Patent Number: 5,393,390
[45] Date of Patent: Feb. 28, 1995

[54] TREATMENT AND RECYCLING OF OVERSPRAY FROM THE SPRAY APPLICATION OF WATERBORNE COATINGS

[75] Inventors: Karl-Heinz Freese, Stuttgart; Gerhard Günter, Ettlingen, both of Germany

[73] Assignee: Akzo Nobel nv, Arnhem, Netherlands

[21] Appl. No.: 140,209

[22] PCT Filed: May 7, 1992

[86] PCT No.: PCT/EP92/00996
§ 371 Date: Dec. 13, 1993
§ 102(e) Date: Dec. 13, 1993

[87] PCT Pub. No.: WO92/19686
PCT Pub. Date: Nov. 12, 1992

[30] Foreign Application Priority Data
May 8, 1991 [EP] European Pat. Off. ........ 91201107

[51] Int. Cl.⁶ .................................................. C25F 5/00
[52] U.S. Cl. ............................. 204/131; 204/180.2; 204/300 EC
[58] Field of Search ............... 204/180.2, 131, 300 EC

[56] References Cited
U.S. PATENT DOCUMENTS
3,748,244 7/1973 Gilchrist ............................ 204/180
4,607,592 8/1986 Richter ............................... 118/689

FOREIGN PATENT DOCUMENTS
8202543 5/1982 European Pat. Off. .
0141171 9/1984 European Pat. Off. .
8704638 2/1987 European Pat. Off. .
9219686 11/1992 European Pat. Off. .
3428300 2/1986 Germany .
100135 of 1974 Japan .

*Primary Examiner*—John Niebling
*Assistant Examiner*—Kishor Mayekar
*Attorney, Agent, or Firm*—Louis A. Morris; James K. Poole; Ralph J. Mancini

[57] ABSTRACT

A process and apparatus for treating overspray from the spray application of waterborne coatings is provided, which includes at least an electrophoresis separation step (means) for recovering substantially all of solids and higher molecular weight water-soluble components and a second separation step (means) for recovering the remainder. The result of such treatment is a recyclable waterborne coating stream of substantially the same composition as the waterborne coating and a recyclable water stream containing substantially none of the resin or additive parts of the original waterborne coating. The process and apparatus are effective, efficient and relatively simple, and recycling is effected without the use of coagulants, detackifiers and other chemical additives which may complicate the recycling procedure and have a detrimental effect on the so recycled products.

14 Claims, 3 Drawing Sheets

TREATMENT AND RECYCLING OF OVERSPRAY FROM THE SPRAY APPLICATION OF WATERBORNE COATINGS

BACKGROUND OF THE INVENTION

The present invention relates generally to a process for spray coating an object with a waterborne coating and, more particularly, to a process for the treatment and recycling of overspray resulting from such spray coating. The present process is applicable in industry in general and, especially, in the automotive industry where car bodies and a wide variety of other larger objects are spray coated.

Efficient coating of automobiles and other larger objects with liquid coatings normally requires spray application. Current spray application techniques generate a significant amount of overspray and, in order to isolate this overspray from the immediate surrounding environment, the spraying operation is normally conducted in a spray booth.

The overspray occurring, for example, during automobile coating with waterborne coatings is normally removed from the spray booth by an exhaust air stream and/or absorbed in water (water curtains or cascades) circulated from a catchment tank. When it is considered that in one automobile spray booth alone approximately 1–1.5 tons of paints are applied daily and approximately 20–30% of this is overspray, the magnitude of the resulting waste problem is apparent.

There exist essentially two options with respect to handling this waste product—disposal and/or recycling. Because of the large volumes generated, and because of the environmental consequences involved, disposal is a burdensome and very expensive option. Recycling, therefore, becomes the desirable alternative.

Waterborne coatings utilized in general industry, and particularly in the automotive field, can include a large number of solid and/or liquid components. These components can generally be broken down into three primary categories with subcategories as set forth below:
(I) a substantial amount of water;
(II) a variety of resins (generally higher molecular weight organic compounds) including one or more of water-insoluble, water-dispersible and/or water-soluble components; and
(III) optionally, a variety of additives including, for example, water-insoluble (e.g. pigments), water-dispersible (e.g., emulsifiers, stabilizers and rheological additives) and/or water-soluble (e.g. lower molecular weight polar organic co-solvents, acids and amines) components.

The sheer variety of components makes effective treatment and recycling a difficult task.

The currently practiced recycling procedures for waterborne coatings require the addition of coagulating agents and/or detackifiers to the collected overspray. The resulting coagulate is extracted by sedimentation, flotation, filtration and/or similar separation processes, and subsequently removed from the spraying area. Due to the presence of the added chemicals, and due to the coagulated form of the recovered product, recycling is a costly and complex process. In addition, the chemical additives often affect the properties of any reclaimed product, and separation of many water-soluble materials, such as low molecular weight organic cosolvents, acids and amines, remains a problem.

Various other recycling methods have also been proposed, but none have been totally successful. For example, WO82/02543 describes a method for recovery and recycling of waterborne coating overspray, whereby the overspray is collected and separated (e.g. by a traveling screen filter or a settling tank) into a low and high solids (e.g. 10–50% solids) fraction. The solids content of the high solids fraction is preferably adjusted to fall within the range of 5–30% solids (e.g. by the addition of water), then passed in the form of a slurry to a decanter centrifuge, of a type well-known in the art, which further separates the liquid from the solids. The solid component is said to comprise about 75 wt % solids, which can be utilized as a base for a reclaimed paint product, or can be further dried for disposal at a landfill. The liquid component, which can be recycled back to the spray booth, is said to typically comprise less than 1 wt % solids. As is clear, the separation methods described in the reference are generally ineffective for separating water-soluble components and, especially, the aforementioned lower molecular weight water-soluble components which tend to build up in the recycled water.

U.S. Pat. No. 4,607,592 discloses a method of processing overspray in conjunction with the use of a complicated apparatus and a burdensome procedure. Separation is accomplished via a complex and special filter and filtration technique into concentrated and clear water fraction. The concentrated fraction is said to contain the solids and water-soluble components of the overspray, with the composition of the concentrated fraction being automatically adjusted to meet the composition of the fresh paint. The reclaimed paint is then recycled by adding it to the fresh paint feed.

While it appears from U.S. Pat. No. 4,607,592 that effective separation and recycling can be accomplished through complex and burdensome means, it would be highly desirable to develop a relatively simple yet effective and efficient recycling method for such waterborne "waste" products which avoids the use of the coagulating and detackifying chemicals mentioned above, and in addition effectively and efficiently recovers all of the components in a form suitable for direct recycling.

SUMMARY OF THE INVENTION

A process has now been discovered which is relatively simple to implement yet results in an efficient and effective separation of such overspray into components directly suitable for recycling.

In accordance with the present invention, there is provided a process for treating overspray collected from the spray coating of an object with a waterborne coating, which waterborne coating comprises:
(A) water,
(B) a resin part including at least one of a water-insoluble, water-dispersible and/or water-soluble component, and
(C) optionally, an additive part including at least one of a water-insoluble, water-dispersible and/or water-soluble component,
which process results in a recyclable waterborne coating stream of substantially the same composition as the waterborne coating and a recyclable water stream containing substantially none of the resin or additive parts of the waterborne coating, and which process comprises the steps of:
(1) collecting at least a portion of the overspray;
(2a) separating the collected overspray into
(i) a concentrated phase comprising (a) a substantial portion of the water-insoluble components of the resin and additive parts,
(b) a portion of the water-dispersible components of the resin and additive parts,
(c) a minor portion of the water and
(d) at least a minor portion of the water-soluble components of the resin and additive parts; and
(ii) a dilute phase comprising
(a) a substantial portion of the water and
(b) the remainder of the resin and additive parts not contained in the concentrated phase;
(2b) electrophoretically separating the dilute phase into
(i) a concentrated fraction comprising
(a) substantially all of the remainder of the resin part,
(b) substantially all of the remainder of the water-insoluble and water-dispersible components of the additive part, and
(c) at least a portion of the water-soluble component of the additive part; and
(ii) a water fraction comprising
(a) a substantial portion of the water,
(b) the residue of the resin and additive parts not contained in the concentrated fraction;
(3) separating the water fraction into
(i) the recyclable water stream and
(ii) a concentrated residue stream;
(4a) recovering the concentrated phase of step (2a);
(4b) recovering the concentrated fraction of step (2b);
(5) recovering the concentrated residue stream of step (3);
(6) generating the recyclable waterborne coating stream by mixing the so-recovered concentrated phase of step (2a), concentrated fraction of step (2b) and concentrated residue stream of step (3) in a manner and with other components necessary to result in a mixture having substantially the same composition as the waterborne coating.

In the above-described process, step (2a) is generally considered to be optional, especially in the case of waterborne clearcoats which contain very small amounts of water-insoluble components. For pigmented systems and other systems containing large amounts of solids, however, greater efficiency can be achieved in the electrophoretic separation step by prior removal of a significant portion of such solids in step (2a).

When step (2a) is not utilized, the process in accordance with the present invention comprises the steps of:
(1) collecting at least a portion of the overspray;
(2) electrophoretically separating the collected overspray into
(i) a concentrated fraction comprising
(a) substantially all of the resin part,
(b) substantially all of the water-insoluble and water-dispersible components of the additive part, and
(c) at least a portion of the water-soluble component of the additive part: and
(ii) a water fraction comprising
(a) a substantial portion of the water,
(b) the residue of the resin and additive parts not contained in the concentrated fraction;
(3) separating the water fraction into
(i) the recyclable waste stream and
(ii) a concentrated residue stream;
(4) recovering the concentrated fraction of step (2);
(5) recovering the concentrated residue stream of step
(6) generating the recyclable waterborne coating stream by mixing the so-recovered concentrated fraction of step (2) and the concentrated residue stream of step (3) in a manner and with other components necessary to result in a mixture having substantially the same composition as the waterborne coating.

It should be noted that electrophoresis has been utilized as a means for recovery and recycling of waste solutions generated from the application of waterborne coatings by electrodeposition (see, for example, JP-LO-100135/1974). The application of electrodeposition to the recycling of overspray from spray applied waterborne coatings, however, is not known from this literature nor is it readily apparent because of the vastly different considerations in formulating and utilizing spray coatings versus electrodeposition coatings.

In conjunction with the aforementioned process, an apparatus for treating overspray produced from the spray coating of an object with a waterborne coating is also provided, which apparatus comprises:
(1a) means for collecting at least a portion of overspray;
(1b) a catchment tank for holding the collected overspray;
(2) electrophoretic separating means, connected to the catchment tank, for electrophoretically separating the collected overspray into
(i) a concentrated fraction comprising
(a) substantially all of the resin part,
(b) substantially all of the water-insoluble and water-dispersible components of the additive part, and
(c) at least a portion of the water-soluble component of the additive part; and
(ii) a water fraction comprising
(a) a substantial portion of the water,
(b) the residue of the resin and additive parts not contained in the concentrated fraction;
(3) means, connected to the electrophoretic separation means, for separating the water fraction into
(i) the recyclable water stream and
(ii) a concentrated residue stream;
(4) means, connected to the electrophoretic separation means, for recovering the concentrated fraction;
(5) means, connected to the means for separating the water fraction, for recovering the concentrated residue stream;
(6) mixing means for generating a recyclable waterborne coating stream from the concentrated fraction, the concentrated residue stream and other components necessary to result in a mixture having substantially the same composition as the waterborne coating,
wherein the recyclable waterborne coating stream comprises substantially the same composition as the waterborne coating, and the recyclable water stream contains substantially none of the resin or additive parts of the waterborne coating.

For treating overspray containing relatively large amounts of water-insoluble components, the apparatus preferably comprises:
(1a) means for collecting at least a portion of the overspray;

(1b) a catchment tank for holding the collected overspray;

(2a) means, interposed between the catchment tank and an electrophoretic separation means, for separating the collected overspray into
  (i) a concentrated phase comprising
    (a) a substantial portion of the water-insoluble components of the resin and additive parts,
    (b) a portion of the water-dispersible components of the resin and additive parts,
    (c) a minor portion of the water and
    (d) at least a minor portion of the water-soluble components of the resin and additive parts; and
  (ii) a dilute phase comprising
    (a) a substantial portion of the water and
    (b) the reminder of the resin and additive parts not contained in the concentrated phase;

(2b) electrophoretic separating means, connected to the means for separating the collected overspray, for electrophoretically separating the dilute phase into
  (i) a concentrated fraction comprising
    (a) substantially all of the resin part,
    (b) substantially all of the water-insoluble and water-dispersible components of the additive part, and
    (c) at least a portion of the water-soluble component of the additive part; and
  (ii) a water fraction comprising
    (a) a substantial portion of the water,
    (b) the residue of the resin and additive parts not contained in the concentrated fraction;

(3) means, connected to the electrophoretic separation means, for separating the water fraction into
  (i) the recyclable water stream and
  (ii) a concentrated residue stream;

(4a) means, connected to the means for separating the overspray, for recovering the concentrated phase;

(4b) means, connected to the electrophoretic separation means, for recovering the concentrated fraction;

(5) means, connected to the means for separating the water fraction, for recovering the concentrated residue stream;

(6) mixing means for generating the recyclable waterborne coating stream from the concentrated phase, the concentrated fraction, the concentrated residue stream and other components necessary to result in a mixture having substantially the same composition as the waterborne coating.

Still further, a process for spray coating an object with a waterborne coating is provided, wherein overspray is generated by the spray coating, characterized in that the overspray is treated as described above to generate the recyclable waterborne coating stream and the recyclable water stream, at least a portion of the so-generated recyclable waterborne coating stream is recycled for spray application onto the object, and at least a portion of the recyclable water stream is recycled for use in collecting the overspray.

Finally, an apparatus for spray coating an object with a waterborne coating is provided, which comprises a spray booth, the apparatus for treating overspray as described above, a means for recycling at least a portion of the so-generated recyclable waterborne coating stream for spray application onto the object, and a means for recycling at least a portion of the recyclable water stream for use in collecting the overspray.

These and other features and advantages of the present invention will be more readily understood by those skilled in the art from a reading of the following detailed description with reference to the accompanying drawings.

DETAILED DESCRIPTION OF THE PREFERRED EMBODIMENTS

As indicated previously, waterborne coatings intended for spray application can comprise a wide variety of solid and liquid components in significantly varying amounts. These components can generally be classified into one of three well-known groups—(A) water, (B) a resin part and (C) an additive part.

As utilized herein, the resin part (B) includes those materials which ultimately form the polymer network of the film resulting from application and drying of the waterborne coating. The resin part comprises materials which are generally (but not always) organic in nature, which may be solid or liquid, which are substantially non-volatile under formulation and application conditions, and which may be water-insoluble, water-dispersible or water-soluble. These various "binder" components can comprise, for example, a variety of monomeric, oligomeric and polymeric materials which can be physically drying but preferably contain reactive functionality for crosslinking. In many cases, these binders are crosslinked with the aid of relatively large amounts of preferably multifunctional compounds which react with this functionality and are, consequently, significantly incorporated into the resulting crosslinked polymer network. These "crosslinking agents" include a wide variety of known monomeric, oligomeric and polymeric compounds and, for the purposes of the present description, are considered included in the resin part.

In contrast, curing agents which are utilized in relatively small amounts to "catalyze" the crosslinking reaction but are not significantly incorporated into the polymer network are here considered as included in the additive part (C), as are other components which similarly are not significantly chemically incorporated into the polymer network. The additive part (C) can include a wide variety of organic and inorganic, solid and liquid, water-insoluble, water-dispersible and water-soluble components such as, for example, pigments, water-miscible organic cosolvents, volatile neutralizing agents (e.g. acids and amines), biocides, rheology modifiers, non-reactive emulsifiers and stabilizers, etc.

As a general rule, waterborne coatings intended for spray application will comprise the resin (B) and additive (C) parts in combined amounts ranging from about 25 wt % to about 70 wt % based upon the total weight of the waterborne coating, with water consequently making up the remaining wt %.

Figure 1:
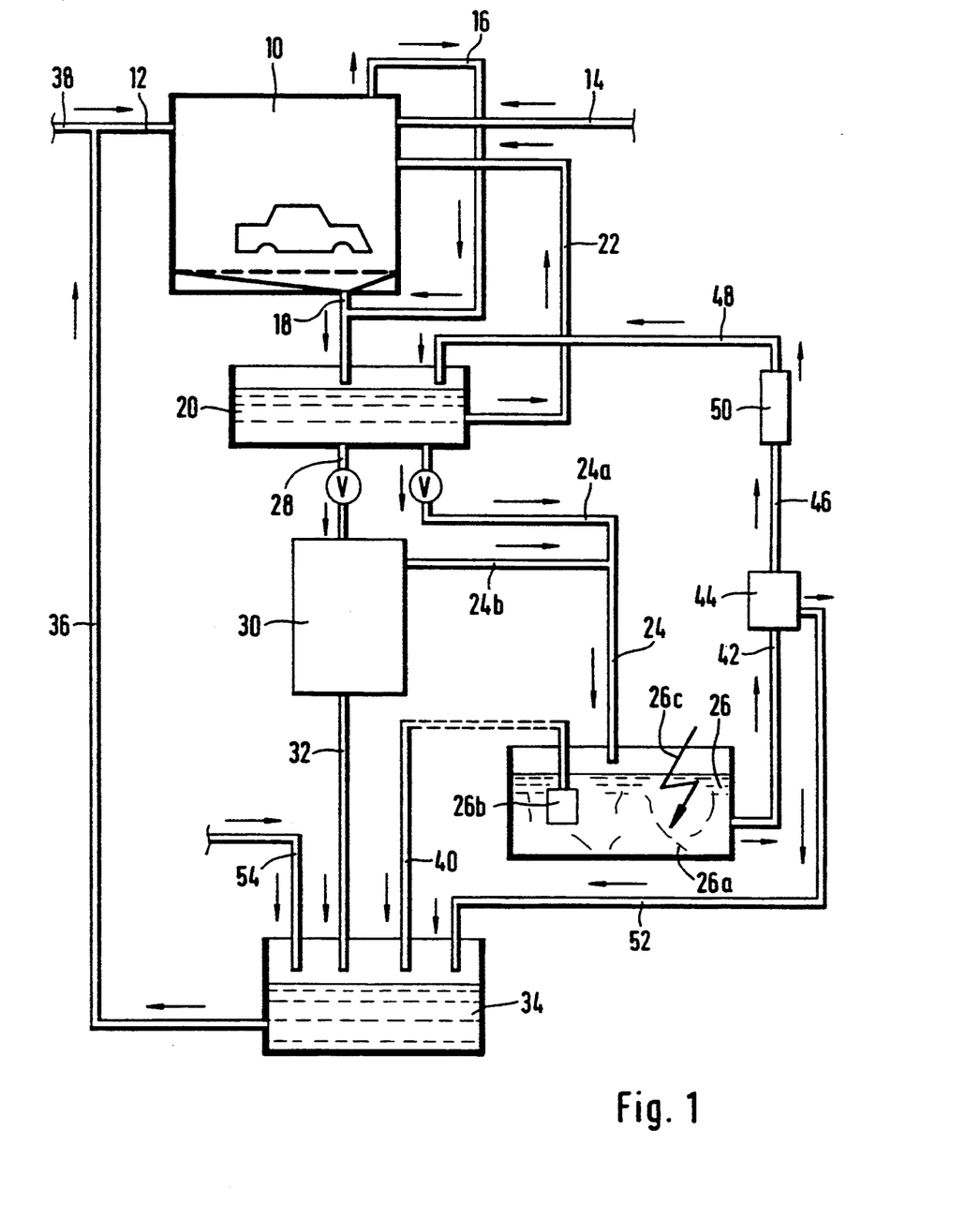
FIG. 1 is an overall schematic of a spray coating and overspray treating process and apparatus in accordance with the present invention.

Referring now to FIG. 1 in more detail, there can be seen a spray booth 10 having connected thereto a paint feed line 12, a water feed line 14, a vapor collection line 16 and a liquid collection line 18. The water feed line 14 may be connected, for example, to a water curtain (not pictured) or other similar means for collecting overspray, which collection means are in general common and well-known in this type of spray application. In fact, the spray application of waterborne coatings is in general well-known to those skilled in the art, and this aspect need not be discussed in further detail.

Referring back to FIG. 1, the collected overspray is passed via lines 16 and 18 to a catchment tank 20, where it is held for further processing as discussed below. At this point, the concentration of the various components can vary widely depending upon the actual operation of the spray booth and means utilized to collect the overspray. In normal practice, at least water curtains or similar collection means are utilized, which results in a substantial dilution of the resin and additive parts of the overspray. In the present system, this dilution is preferred because a portion of the content of catchment tank 20 is supplied via line 22 to spray booth 10 for use in the collection of the overspray.

In the preferred operation, the concentration of the resin (B) and additive (C) parts in catchment tank 20 should be maintained within the range of from about 0.5 wt % to about 20 wt % based upon the total weight contained therein. At this point in the process, the proportions of the resin and additive parts relative to each other should not significantly vary from that of the fresh waterborne coating, with the possible exception of certain volatile components (e.g. low molecular weight co-solvents, acids and amines) which may evaporate prior to further treatment.

From catchment tank 20, the overspray is optionally first passed through a rough separation means (not pictured), such as a 1000 mesh sieve, to remove any large particulate or other foreign matter. Further processing of the overspray can then take one of two courses depending upon the composition of the waterborne coating. In one, the overspray is passed via lines 24a and 24 directly to an electrophoretic separation means 26. In the other, the overspray is passed via line 28 into a first separation means interposed between catchment tank 20 and electrophoretic separation means 26.

If the coating contains significant amounts of solid components, and especially water-insoluble solids such as pigments, for most efficient operation of electrophoretic separation means 26 it is preferred that the overspray first be passed via line 28 into first separation means 30, which is capable of separating out a substantial portion of these water-insoluble components and at least a portion of the water-dispersible components of (B) and (C).

First separation means 30 can take any one of a number of forms well-known for separating solids from liquids such as, for example, settling tanks, centrifuges, sedimentation filters and the like, as well as combinations thereof. Of these various well-known options, it is preferred to utilize at least a centrifuge, such as a horizontal centrifuge equipped with a screw conveyor.

The result of this first separation step is
(i) a concentrated phase of preferably less than 50% by weight, and more preferably less than 35% by weight (based upon the total weight of the concentrated phase) of water, which concentrated phase includes:
  (a) a substantial portion of the water-insoluble components of (B) and (C),
  (b) a portion of the water-dispersible components of (B) and (C),
  (c) a minor portion of the water and
  (d) at least a minor portion of the water-soluble components of (B) and (C); and
(ii) a dilute phase including:
  (a) a substantial portion of the water and
  (b) the reminder of (B) and (C) not contained in the concentrated phase.

The concentrated phase is then passed via line 32 to a recovery means 34 (e.g. a mixing tank), which in FIG. 1 is utilized for recovery of the various components of (B) and (C) separated from the overspray, as well as the reformulation of these so-recovered components into a recycle stream 36 which can be recycled in combination with a fresh waterborne coating stream 38 as the paint feed (paint feed line 12). These aspects are discussed further below.

The dilute phase, which my still contain significant amounts of many of the components of (B) and (C), is then passed via lines 24b and 24 to electrophoretic separation means 26.

Electrophoretic separation means 26 is based upon electrophoresis coatings principles which are well-known to those skilled in the art and need not be explained here in detail. Further detailed information in this respect can be found by reference to any number of well-known literature sources such as, for example, Willibald Machu, *Elektrotauchlackierung*, Verlag Chemie, Weinheim 1974.

In general terms, electrophoretic separation means 26 comprises a bath 26a which is provided with an electrode 26b and a source of electric current 26c. Depending upon the components of the overspray, electrode 26b can be utilized as an anode (for components containing anionic groups such as carboxyl groups) or a cathode (for components containing cationic groups such as amine groups). Upon application of the electric current, substantially all of (B) and (C) are deposited on electrode 26b, leaving substantially clean water in bath 26a. The only exception is that the lower molecular weight water-soluble additives, such as organic co-solvents, acids and amines, tend to remain in solution and are only removed at this point to a minor extent.

The result of the electrophoretic separation step is a concentrated fraction comprising:
  (a) substantially all of the remainder of (B),
  (b) substantially all of the remainder of the water-insoluble and water-dispersible components of (C), and
  (c) at least a portion of the remainder of the water-soluble component of (C); and
a water fraction comprising:
  (a) a substantial portion of the water,
  (b) the residue of (B) and (C) not contained in the concentrated fraction.

The concentrated fraction from the electrophoretic separation step can be recovered, for example, by removing electrode 26b from bath 26a, then cleaning the deposited material from the surface of electrode 26b. This can be accomplished in any number of ways, such as by scraping and/or soaking the electrode in a diluted solution of the original waterborne coating. The so-recovered concentrated fraction is then passed via line 40 to recovery means 34 for further processing.

The water fraction, now comprising only very small amounts of (B) and (C) contained in the original overspray, and preferably less than 1.0 wt % based upon the total weight of the water fraction, is then further processed by passing it via line 42 to a second separation means 44, where substantially the rest of these other components are removed leaving a relative high purity water stream 46 which can, for example, be recycled back via line 48 to catchment tank 20, or which can be safely and easily disposed of. Prior to recycling of water stream 46, it is preferably passed by an ultra-violet light source 50 to prevent bacteria build-up in the system.

Second separation means 44 can take any one of a number of forms well-known for separation of solutions (separation on a molecular level) such as, for example, ultra- or reverse osmosis filtration. Again, these separation means are well-known to those skilled in the relevant art, and need not be discussed further here.

The concentrated residue stream produced from this separation step is passed via line 52 to recovery means 34.

Recovery means 34, therefore, will contain all of the recovered components of (B) and (C) from the overspray plus some water carried therewith. Because there has been no chemical treatment of the overspray, the recovered components are essentially in the same state as contained in the original waterborne coating, although relative concentrations my vary. In order to make the mixture suitable for recycling, that is, substantially the same composition as the original waterborne coating, the necessary components can be added via make-up line 54 and mixed into the system by well-known waterborne coating formulating techniques.

The result, as indicated above, is a recyclable paint stream of substantially the same composition as the original waterborne coating, which can be recycled via line 36 and combined with fresh waterborne coating from line 38 for spray application.

Figure 2:
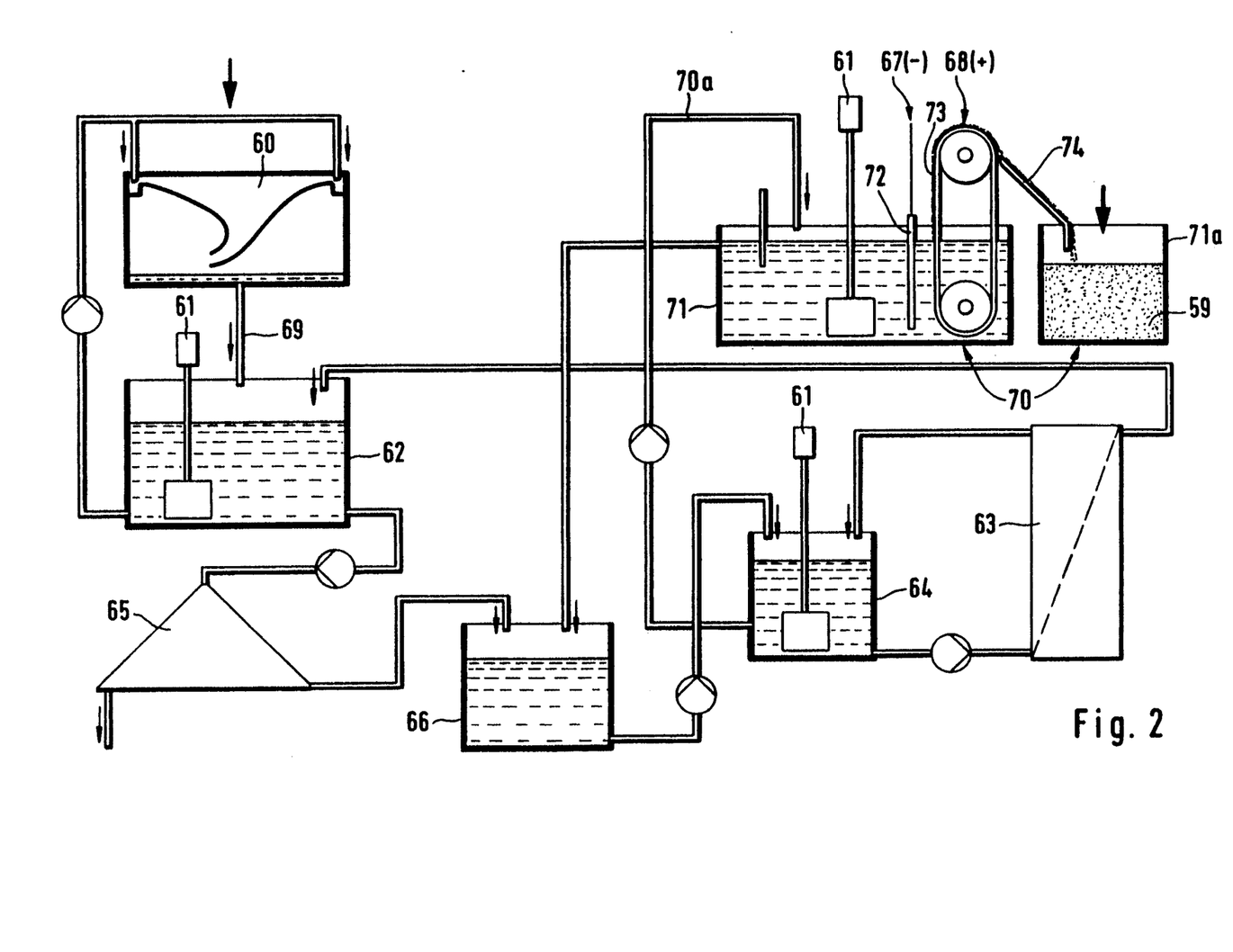
FIG. 2 is a more detailed schematic of a spray coating and overspray treating process and apparatus in accordance with the present invention.

Referring now to FIG. 2, there is shown a more detailed representation of a recycling process and apparatus in which a spray booth 60 is connected to a catchment tank 62 to hold the collected overspray 69, catchment tank 62 being provided with a stirring means 61.

Catchment tank 62 is further connected to a separation means 65 such as a centrifuge as mentioned earlier, which substantially separates the solid components of the overspray from the other components thereof. The resulting stream which is substantially free of solid components is then passed to an intermediate tank 66 and then to a concentrate tank 64 equipped with a stirrer 61. Concentration tank 64 is in turn connected to an ultrafiltration means 63 and an electrophoretic separation means 70.

The electrophoretic separation means 70 in accordance with FIG. 2 also utilizes the well-known principle of electrophoretic coating, the deposition process being controlled to such an extent that on the deposition surface 73 of electrophoretic separation means 70 a loose paint layer forms which is easily removable, e.g., via mechanical means 74 such as a scraper.

The particular construction of the electrophoretic separation means 70 of FIG. 2 is generally characterized by an electrophoresis bath 71 (equipped with a stirrer 61) for receiving the stream 70a from concentrate tank 64, an electrode 67 (72) suspended in bath 71 and, as the reciprocal electrode 68, a rotating deposition surface 73 which has in adjoining arrangement one or more mechanical scraper elements 74 to remove the paint material adhering to deposition surface 73, such removed paint material 59 being consigned to a separate recovery tank 71a.

For optimum processing, it is important that the liquid currents in the electrophoresis bath 71 are influenced to such an extent that in the area of the electrodes 67 and 68 neither foam formation nor an accumulation of paint material results, and that electrophoresis bath 71 be cooled at least in the area of electrodes 67 and 68.

Since practice has shown that optimum paint deposition conditions are material-specific, the relevant settings and/or adjustments must be made for the deposition time, the amount of and allowed ripple in the applied direct current as well as the current limits and pH-value control by amine addition or the like.

Demineralized water is preferably utilized in the process (e.g., for the water curtain) for the reasons and advantages as described in DE-OS-8300 (which is incorporated by reference).

Further, as can be seen from FIG. 2, it is preferred to recycle the water obtained in the various separation steps back to the spray booth water system.

Figure 3:
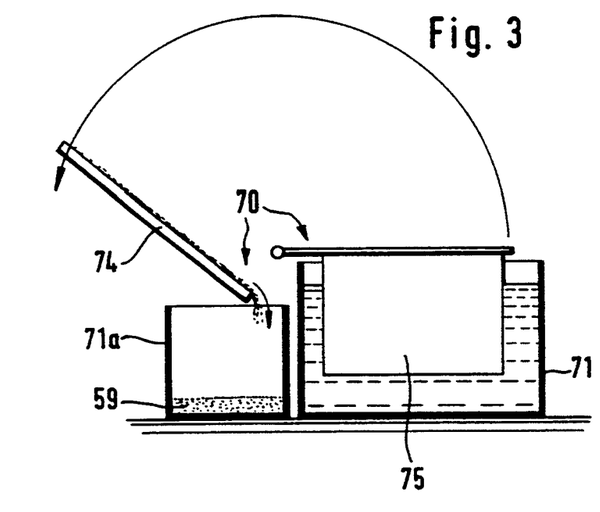
FIGS. 3–5 are schematic representations of various electrophoretic separation means for use in the spray coating and overspray treating process and apparatus in accordance with the present invention.
Figure 3A:
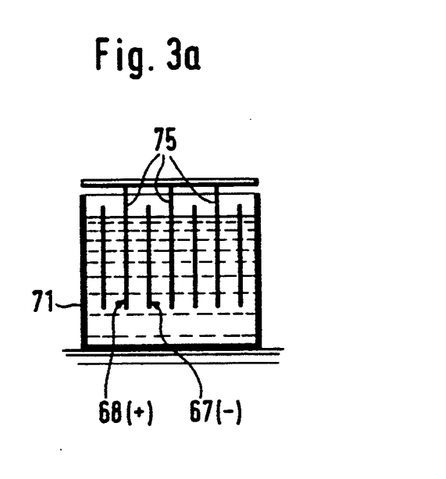
Figure 4:
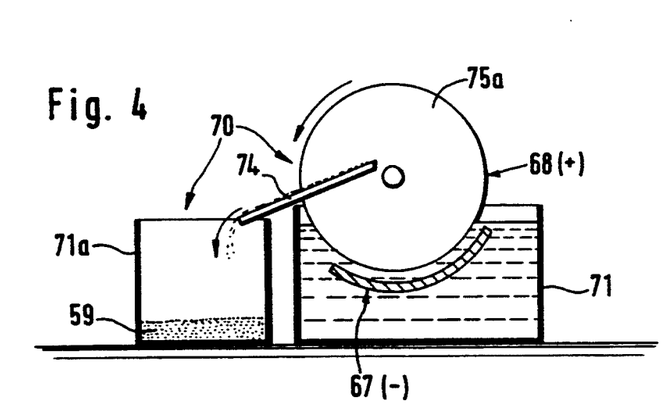
Figure 5:
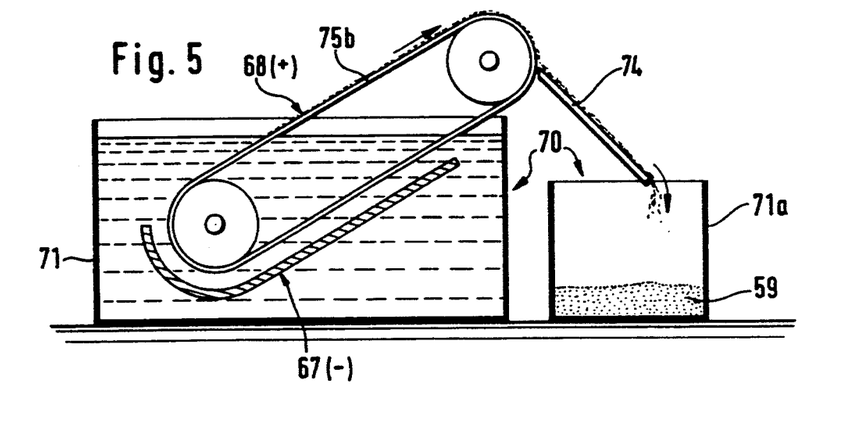

As shown in FIGS. 3 to 5, a number of alternative constructions can be provided for the deposition surface 73 and mechanical scraper elements 74 including the following;

a. A parallel arrangement of e.g. plates 75 which periodically immerse in bath 71 and which pivot together with the scraper 74 to the recovery tank 71a (FIG. 3).

b. Rotating discs 75a immersed in bath 71 according to FIG. 4, whereby the scraper 74 also acts as a run-off surface for paint material 59.

c. Configuration as described under b.; utilizing however a rotating roller as alternative deposition surface (not pictured).

d. A rotating endless steel band 75b as deposition surface 73, arranged vertically or inclined in, and partially projecting from, bath 71, with a corresponding scraper 74 having a run-off surface to paint recovery tank 71a (FIG. 5).

In addition, a degree of surface roughness on the deposition surfaces to improve adhesion of the paint material can be advantageous, as can also the provision of (not pictured) drying elements such as warm-air jets, infra-red lamps or the like in the area of the deposition elements not immersed in the electrophoresis bath.

Finally, warming of the bath caused by the electric current has to be counter-balanced and the necessary cooling of bath 71 results from cooling elements assigned to the area of the deposition electrodes 67,68; this can be carried out by, for example, internal cooling when using a roller 75b as deposition element, or by cooling coils on or in bath 71.

The systems described can be further supplemented by a subsequent dewatering of the paint material after the mechanical scraping procedure, for example by squeegee rollers with possible further transport of the separated paint material by means of a screw conveyor or the like to a recovery and/or storage tank (not pictured).

The great advantage, as can be seen, is that substantially nothing need be wasted in the present system since everything can be recycled. An important point is that this is accomplished without the need to add potentially detrimental chemicals to the overspray, which is the currently practiced method. Further, the presently described system is effective and efficient, yet relatively simple in its construction and implementation.

Only a limited number of preferred embodiments of the present invention have been described above. One skilled in the art, however, will recognize numerous substitutions, modifications and alterations which can be made without departing from the spirit and scope of the invention as limited by the following claims.

We claim:

1. A process for treating overspray collected from the spray coating of an object with a waterborne coating, which waterborne coating comprises:
   (A) water,
   (B) a resin part including at least one of a water-insoluble, water-dispersible and water-soluble component, and
   (C) optionally, an additive part including at least one of a water insoluble, water dispersible and water-soluble component,
   which process results in a recyclable waterborne coating stream of substantially the same composition as the waterborne coating and a recyclable water stream containing substantially none of the resin or additive parts of the waterborne coating, which process comprises the steps of:
   (1) collecting at least a portion of the overspray in collection means;
   (2) electrophoretically separating the collected overspray with electrophoretic separating means into
      (i) a concentrated fraction comprising
         (a) substantially all of the resin part,
         (b) substantially all of the water-insoluble and water-dispersible components of the additive part, if present, and
         (c) at least a portion of the water-soluble component of the additive part, if present; and
      (ii) a water fraction comprising
         (a) a substantial portion of the water,
         (b) the residue of the resin and additive parts not contained in the concentrated fraction;
   (3) separating the water fraction into
      (i) the recyclable water stream and
      (ii) a concentrated residue stream;
   (4) recovering the concentrated fraction of step (2);
   (5) recovering the concentrated residue stream of step (3); and
   (6) generating the recyclable waterborne coating stream by mixing the recovered concentrated fraction of step (2) and the recovered concentrated residue stream of step (3) in a manner and with other components necessary to result in a mixture having substantially the same composition as the waterborne coating of the overspray.

2. A process according to claim 1, wherein prior to step (2), said process further comprises the steps of first separating the collected overspray into
   (i) a concentrated phase comprising
      (a) a substantial portion of the water-insoluble components of the resin and additive parts, if present,
      (b) a portion of the water-dispersible components of the resin and additive parts, if present,
      (c) a minor portion of the water and
      (d) at least a minor portion of the water-soluble components of the resin and additive parts; if present, and
   (ii) a dilute phase comprising
      (a) a substantial portion of the water and
      (b) the remainder of the resin and additive parts not contained in the concentrated phase;
   followed by recovering the concentrated fraction and treating the dilute phase according to step (2) of claim 1.

3. A process for spray coating an object with a waterborne coating which generates an overspray which comprises:
   (A) water,
   (B) a resin part including at least one of a water-insoluble, water-dispersible and water-soluble component, and
   (C) optionally, an additive part including at least one of a water-insoluble, water-dispersible and water-soluble component,
   wherein the overspray is generated by said process, and wherein the overspray is treated in accordance with the process of claim 1 or claim 2 which process comprises the steps of recycling, at least a portion of the so-generated recyclable waterborne coating stream for spray application onto the object, and recycling at least a portion of the recyclable water stream for use in collecting the overspray.

4. An apparatus for treating overspray produced from the spray coating of an object with a waterborne coating which comprises:
   (A) water,
   (B) a resin part including at least one of a water-insoluble, water-dispersible and/or water-soluble component, and
   (C) optionally, an additive part including at least one of a water-insoluble, water-dispersible and water-soluble component,
   which apparatus comprises:
   (1a) means for collecting at least a portion of the overspray;
   (1b) a catchment tank for holding the collected overspray;
   (2b) electrophoretic separating means, connected to the catchment tank, for electrophoretically separating the collected overspray into
      (i) a concentrated fraction comprising
         (a) substantially all of the resin part,
         (b) substantially all of the water-insoluble and water-dispersible components of the additive part, if present and
         (c) at least a portion of the water-soluble component of the additive part; and
      (ii) a water fraction comprising
         (a) a substantial portion of the water,
         (b) the residue of the resin and additive parts not contained in the concentrated fraction;
   (3) means, connected to the electrophoretic separation means, for separating the water fraction into
      (i) a recyclable water stream and
      (ii) a concentrated residue stream;
   (4b) means, connected to the electrophoretic separation means, for recovering the concentrated fraction;
   (5) means, connected to the means for separating the water fraction, for recovering the concentrated residue stream;
   (6) mixing means for generating a recyclable waterborne coating stream from the concentrated fraction, the concentrated residue stream and other components necessary to result in a mixture having substantially the same composition as the waterborne coating, wherein the recyclable waterborne coating stream comprises substantially the same composition as the waterborne coating, and the recyclable water stream contains substantially none of the resin or additive parts of the waterborne coating.

5. An apparatus according to claim 4, wherein the apparatus further comprises:

means, interposed between the catchment tank and an electrophoretic separation means, for separating the collected overspray into (i) a concentrated phase comprising
   (a) a substantial portion of the water-insoluble components of the resin and additive parts, if present,
   (b) a portion of the water-dispersible components of the resin and additive parts, if present,
   (c) a minor portion of the water and
   (d) at least a minor portion of the water-soluble components of the resin and additive parts, if present; and (ii) a dilute phase comprising
   (a) a substantial portion of the water and
   (b) the remainder of the resin and additive parts not contained in the concentrated phase.

6. An apparatus for spray coating of an object with a waterborne coating which comprises:

(A) water, (B) a resin part including at least one of a water-insoluble, water-dispersible and/or water soluble, component, and (C) optionally, an additive part including at least one of a water-insoluble, water-dispersible and water-soluble component; which apparatus comprises a spray booth having connected thereto the apparatus for treating overspray as set forth in claim 4 or claim 5, means for recycling at least a portion of the so-generated recyclable waterborne coating stream for spray application onto the object, and means for recycling at least a portion of the recyclable water stream for use in collecting the overspray.

7. The apparatus according to claim 6, wherein the electrophoretic separation means comprises an electrophoresis bath, an electrode and a reciprocal electrode as deposition surface suspended in the electrophoresis bath, mechanical means in adjoining arrangement to the reciprocal electrode for removing a paint layer formed on the reciprocal electrode, and a recovery tank for receiving the paint layer removed from the reciprocal electrode by the mechanical means.

8. The apparatus according to claim 7, wherein the deposition surface comprises a parallel arrangement of plates which pivot together with a scraper as the mechanical means to the recovery tank.

9. The apparatus according to claim 7, wherein the deposition surface comprises a rotating disc partially immersed in the electrophoresis bath, whereby the mechanical means is arranged so that it acts as a run-off surface to the recovery tank.

10. The apparatus according to claim 7, wherein the deposition surface comprises a rotating roller partially immersed in the electrophoresis bath, whereby the mechanical means is arranged so that it acts as a run-off surface to the recovery tank.

11. The apparatus according to claim 7, wherein the deposition surface comprises a vertical or inclined endless steel band partially immersed in the electrophoresis bath, whereby the mechanical means is arranged so that it acts as a run-off surface to the recovery tank.

12. The apparatus according to claim 7, wherein the surface of the deposition surface possesses sufficient roughness to improve adhesion of the paint layer deposited thereon.

13. The apparatus according to claim 7, wherein cooling elements are further provided in the electrophoresis bath in the area of the electrode and reciprocal electrode.

14. The apparatus according to claim 7, wherein drying elements are further provided in the area of the reciprocal electrode not immersed in the electrophoresis bath.

* * * * *